US005412684A

United States Patent [19]

Schlie et al.

[11] Patent Number: 5,412,684

[45] Date of Patent: May 2, 1995

[54] MICROWAVE EXCITED GAS LASER

[75] Inventors: LaVerne A. Schlie, Albuquerque, N. Mex.; Brian Turner, Myersville, Md.; John E. Waymouth, Marblehead, Mass.

[73] Assignee: Fusion Systems Corporation, Rockville, Md.

[21] Appl. No.: 29,658

[22] Filed: Mar. 10, 1993

[51] Int. Cl.[6] .............................................. H01S 3/097

[52] U.S. Cl. ........................................ 372/82; 372/56

[58] Field of Search .................................. 372/56, 82

[56] References Cited

U.S. PATENT DOCUMENTS

| | | | |
|---|---|---|---|
| 3,493,845 | 2/1970 | Bramley . | |
| 3,496,485 | 2/1970 | Gurs et al. . | |
| 3,521,119 | 7/1970 | Ahmed et al. . | |
| 3,585,524 | 6/1971 | Silfvast . | |
| 3,597,700 | 8/1971 | Rouy . | |
| 3,614,653 | 10/1971 | Javan et al. . | |
| 3,721,915 | 3/1973 | Reilly | 372/87 |
| 3,748,594 | 7/1973 | Pugh | 372/83 |
| 3,772,611 | 11/1973 | Smith . | |
| 3,798,568 | 3/1974 | Willett . | |
| 4,414,488 | 11/1983 | Hoffman et al. | 372/64 |
| 4,513,424 | 4/1985 | Waynant et al. . | |
| 4,538,275 | 8/1985 | Szu | 372/2 |
| 4,618,961 | 10/1986 | Sutter, Jr. . | |
| 4,876,692 | 10/1989 | Bramley . | |
| 4,890,294 | 12/1989 | Nishimae et al. . | |
| 4,951,297 | 8/1990 | Gole et al. | 372/86 |
| 4,955,035 | 3/1990 | Gekat . | |
| 5,020,071 | 5/1991 | Gole et al. | 372/89 |
| 5,050,182 | 9/1991 | Gole et al. | 372/89 |
| 5,301,203 | 4/1994 | Schlie et al. | 372/58 |

OTHER PUBLICATIONS

J. J. Rocca, J. D. Meyer and G. J. Collins, "Cw Laser Oscillations in Cd II in an Electron Beam Created Plasma", Department of Electrical Engineering, Colorado State University, Fort Collins, Colo. 80523, USA, vol. 90A, No. 7, pp. 358–360, Jul. 1982.

L. Bertrand, J. M. Gagne, B. Mongeau, B. Lapointe, Yl. Conturie, and M. Moisan, "A Continuous HF Chemical Laser: Production of Fluorine Atoms by a Microwave Discharge", Journal of Applied Phy., vol. 48, No. 1, Jan. 1977, pp. 224–229.

John P. Golsborough, "Cyclotron Resonance Excitation of Gas–Ion Laser Transitions", Applied Physics Letters, vol. 8, No. 9, pp. 218–219, May 1966.

E. L. Latush, V. S. Mikhalevskii, M. F. Sem, G. N. Tomachev, and V. Ya. Khasilov, "Metal–Ion Transition Lasers With Transverse HF Excitation", JETP Lett., vol. 24, No. 2, 20 Jul. 1976, pp. 69–71.

S. V. Baranov, V. A. Vaulin, M. I. Lomaev, V. N. Slinko, S. S. Sulakshin, and V. F. Tarasenko, "Use of High–Power Microwave Pumping For Plasma Lasers", Sov. J. Quantum Electron, 19(3), Mar. 1989, pp. 300–302.

*Primary Examiner*—Rodney B. Bovernick
*Assistant Examiner*—Robert E. Wise
*Attorney, Agent, or Firm*—Pollock, Vande Sande & Priddy

[57] ABSTRACT

A metal vapor/inert gas laser comprises a laser tube containing an inert gas and a metallic material capable of vaporizing and lasing, a microwave energy source, and a slow wave structure proximate the laser tube for coupling microwave energy from the source to the metal vapor in the laser tube. A non-metallic electronegative species can be substituted for the metallic material in the laser tube.

15 Claims, 7 Drawing Sheets

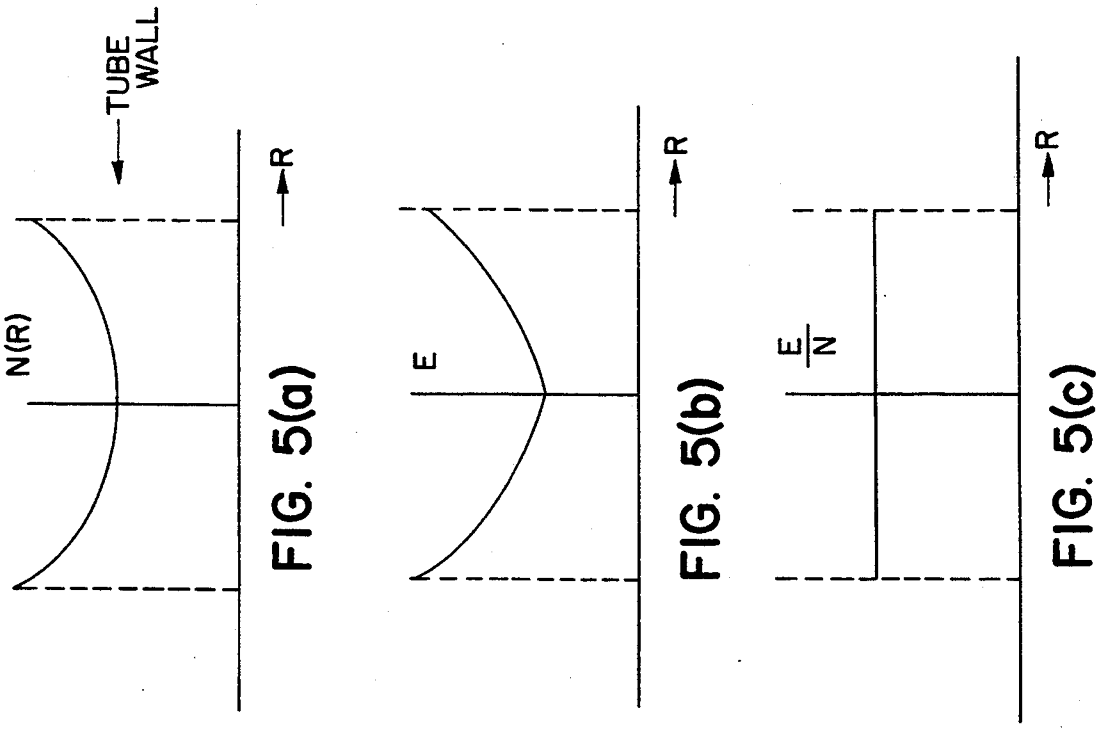
FIG. 5(a)
FIG. 5(b)
FIG. 5(c)
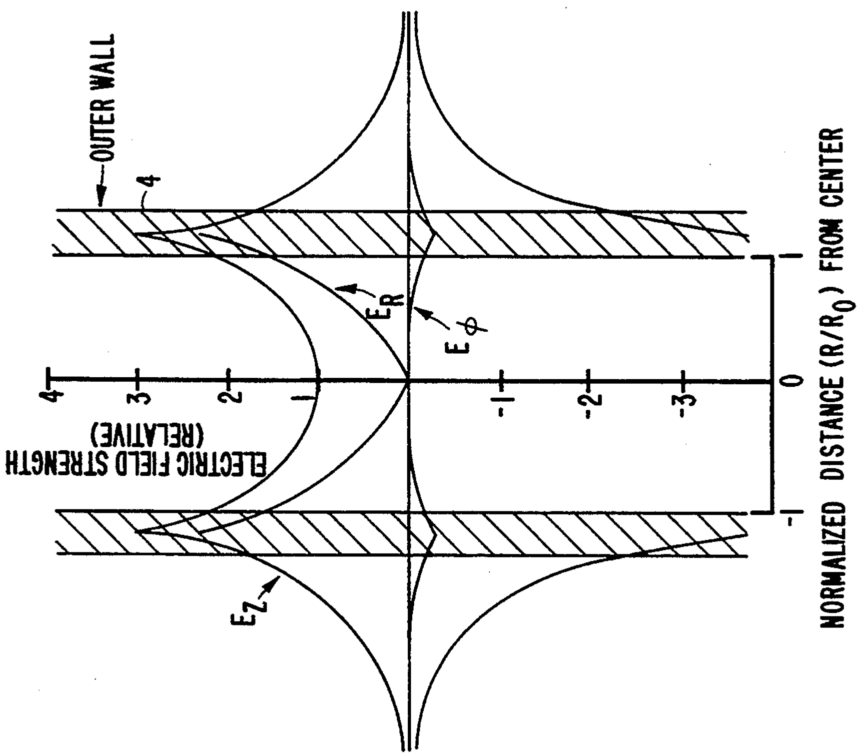
FIG. 4

MICROWAVE EXCITED GAS LASER

The present invention is directed to an improved gas laser, which emits in the visible and ultraviolet parts of the spectrum.

Different types of lasers have been known for many years, and their use is constantly increasing and diversifying. One type of laser is known as the metal vapor/inert gas laser because the gaseous fill of this type of device includes an inert gas (e.g. helium) and the vapor of a metal (e.g. cadmium, selenium, or zinc). While it has appeared that metal vapor/inert gas lasers have much potential, the prior art devices of this type have been limited by short lifetimes, non-uniform light output, low output power, and other problems.

In the metal vapor/inert gas type of laser, the metal vapor is present in the fill in only 1/100th to 1/1000th the concentration of the inert gas. When the fill is excited, the concentration of the inert gas molecules having metastable energies is first increased, and then energy is transferred from the inert gas to the metal vapor by direct charge transfer or Penning ionization processes. A closely related type of laser is the electronegative species/inert gas type where the vapor of electronegative species (e.g., non-metals such as S, Se, and Te, and the compounds thereof, such as halides of Ag, Au, or Cu) are used instead of metal vapor. As used herein, the terms "metal vapor based laser" refers to both the metal vapor and electronegative species types of lasers.

Metal vapor/inert gas lasers of the hollow cathode type are known. These devices are filled with an inert gas, and the metal vapor is created by sputtering the metal from the cathode, which is fabricated or coated with the desired metal. Since these devices have very limited lifetimes and generate significant impurities during operation, their commercial development has not materialized.

It is also known to excite metal vapor/inert gas lasers with electron beam energy. While such devices are capable of producing high power, because of their complexity and the fact that they require large magnets for operation, their use is limited to the laboratory.

Commercial metal vapor/inert gas lasers have been principally of the type which are excited by the application of a D.C. voltage across two electrodes. One problem with such devices, as further discussed below, is that they do not produce a uniform light beam.

To appreciate the benefits of the invention, one must understand the role in the physics of electric discharge in gases of the parameter "E/N", the ratio of energizing electric field strength to number density of atoms or molecules in the gas through which the discharge takes place. Electrons in the plasma of the discharge are accelerated by the electric field, thus gaining energy while still experiencing collisions with other atomic or molecular species. The average energy of the electrons in the plasma, and the distribution of electron energies about that average, is controlled by the energy gained from the electric field between collisions, that is the product of electric field times the mean free path between collisions. Since the mean free path is inversely proportional to the number density of atoms or molecules with which the electron may collide, the ratio E/N is a parameter recognized in the prior art as determining this energy product, and with it the average electron energy and electron energy distribution.

The importance of the electron energy distribution is that it controls the rate of formation of excited states of atoms and molecules by electron collision. For excitation of states at a high energy, high energy electrons are needed, so that such excitations are favored by a high value of E/N. For excitation of low-energy states, lower energy electrons suffice, permitting low values of E/N to be employed. Since the employment of a discharge in a particular gas to generate the population inversion required for a laser inevitably requires selective excitation of a particular excited state of atom, molecule or ion, it is well recognized in the prior art that there is an optimum value of E/N for maximum population inversion and laser performance.

While these matters are well understood and recognized in the prior art, metal-vapor lasers of the prior art have not been able to fully capitalize on the employment of an optimum E/N over the entire volume of a discharge plasma. Such prior-art lasers have employed DC or pulsed discharges with current flow between electrodes at each end of a plasma column in a cylindrical tube. In such a device, the electric field which energizes the electrons is the axial potential gradient in the positive column. This field is independent of radial position in the plasma column. However, the number density of gas atoms in the plasma column varies significantly with radial position. Some of the kinetic energy of the electrons is transferred to the atoms and molecules of the gas as a result of the collisions. This kinetic energy results in the gas being heated. A gas heated in the center by the discharge and cooled by contact with the walls will have a temperature gradient from center to wall. At constant pressure, the number density will vary inversely with gas temperature, as $N \propto 1/T$.

Therefore, although E in such prior-art devices is independent of radius, N is not. As a consequence E/N varies with radial position, being highest in the center and lowest near the walls. It cannot be optimum for exciting the laser upper energy level over any significant fraction of the radius of the plasma column. Accordingly, the degree of population inversion, and the resulting laser gain is highly non-uniform over the cross-section, to the detriment of laser performance.

As will become apparent in the following, in accordance with the present invention, a more uniform value of E/N over the laser tube cross-section is achieved, thereby providing a more uniform gain and superior laser performance.

As used herein, the term "radially uniform" means that substantially all points within the entire central 65% of the laser tube have a value of the parameter being considered (e.g. E/N, gain) which is within ±25% of the average value of the parameter within said central 65% of the volume of the tube.

It is thus an object of the invention to provide a practical, gas laser which is capable of effectively emitting in the visible and/or ultraviolet regions of the spectrum.

In accordance with a first aspect of the invention, a metal vapor based laser is provided which has a radially uniform E/N.

In accordance with another aspect of the invention, a metal vapor based laser is provided which has a radially uniform gain medium.

In accordance with still a further aspect of the invention, a metal vapor based laser is provided which has a radially uniform gain at high E/N values.

In accordance with a further aspect of the invention, a metal vapor based laser which can be used with an unstable resonator is provided.

In accordance with a still further aspect of the invention, a metal vapor based laser is provided which has a radially uniform light output.

In accordance with still another aspect of the invention a metal vapor based laser is provided with an improved excitation scheme. The laser is excited with microwave energy, which is coupled to the fill in such manner as to create a radially uniform gain medium. The resulting laser, which does not have electrodes, has a long lifetime, and overcomes other disadvantages of the prior art metal vapor based lasers.

In accordance with still a further aspect of the invention, the microwave energy is advantageously coupled to the excitable medium by coupling means which includes a slow wave structure.

In accordance with a still further aspect of the invention, the coupling means for the microwave energy includes a slow wave structure and a conductive enclosure.

In accordance with a still further aspect of the invention, the power output of the device is improved by maintaining the wall of the laser gain tube at a substantially uniform temperature along such wall.

Additionally, while the invention is especially applicable to metal vapor based lasers, it is not limited thereto, but rather is broadly applicable to any type of ionic or molecular transition laser which operates in the gas phase at less than the outside pressure, generally 1 atmosphere. For example, such lasers would include those of the inert gas ionic type such as $Ar^+$ and $Kr^+$, and those of the molecular type such as CO and $CO_2$ lasers.

The invention will be better understood by referring to the following drawings, wherein:

FIG. 4 is a graphical illustration of E field variations as a function of the radius of a helical slow wave structure.

FIGS. 5*a*) to *c*) are graphical illustrations of how a uniform E/N is achieved.

Figure 6:
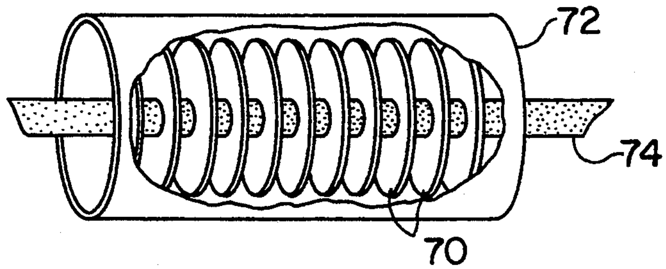
Figure 7:
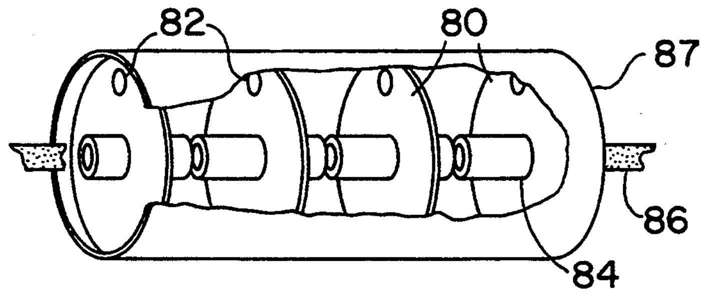
Figure 8:
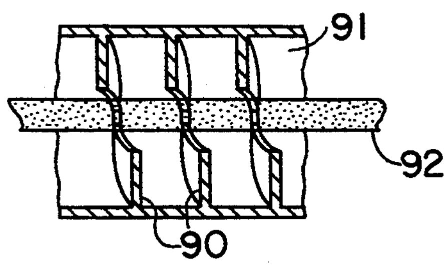

FIG. 6 to 8 are pictorial illustrations of various slow wave structures.

Figure 9:
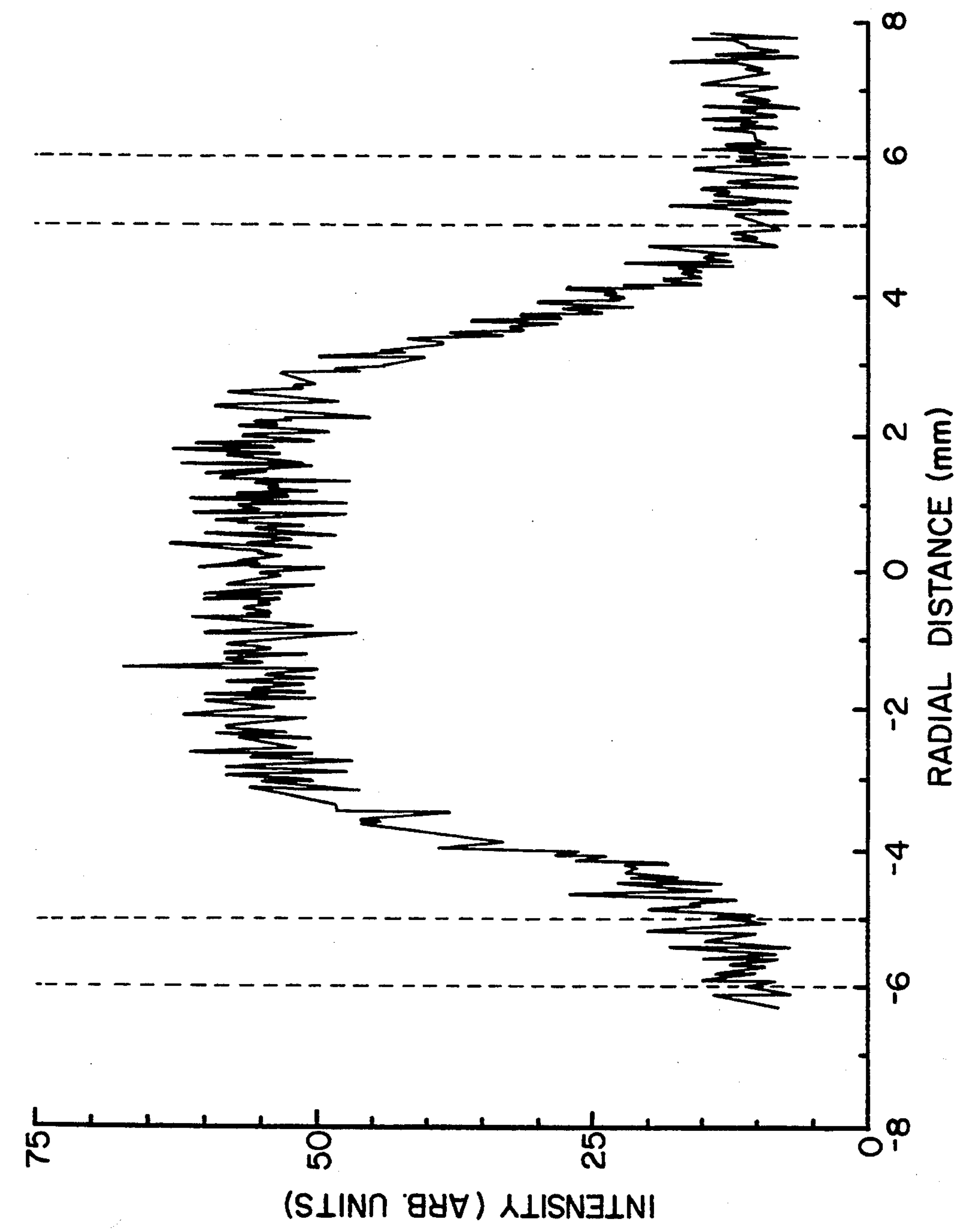

FIG. 9 shows light intensity versus radial bulb position for an embodiment of the present invention.

Figure 10:
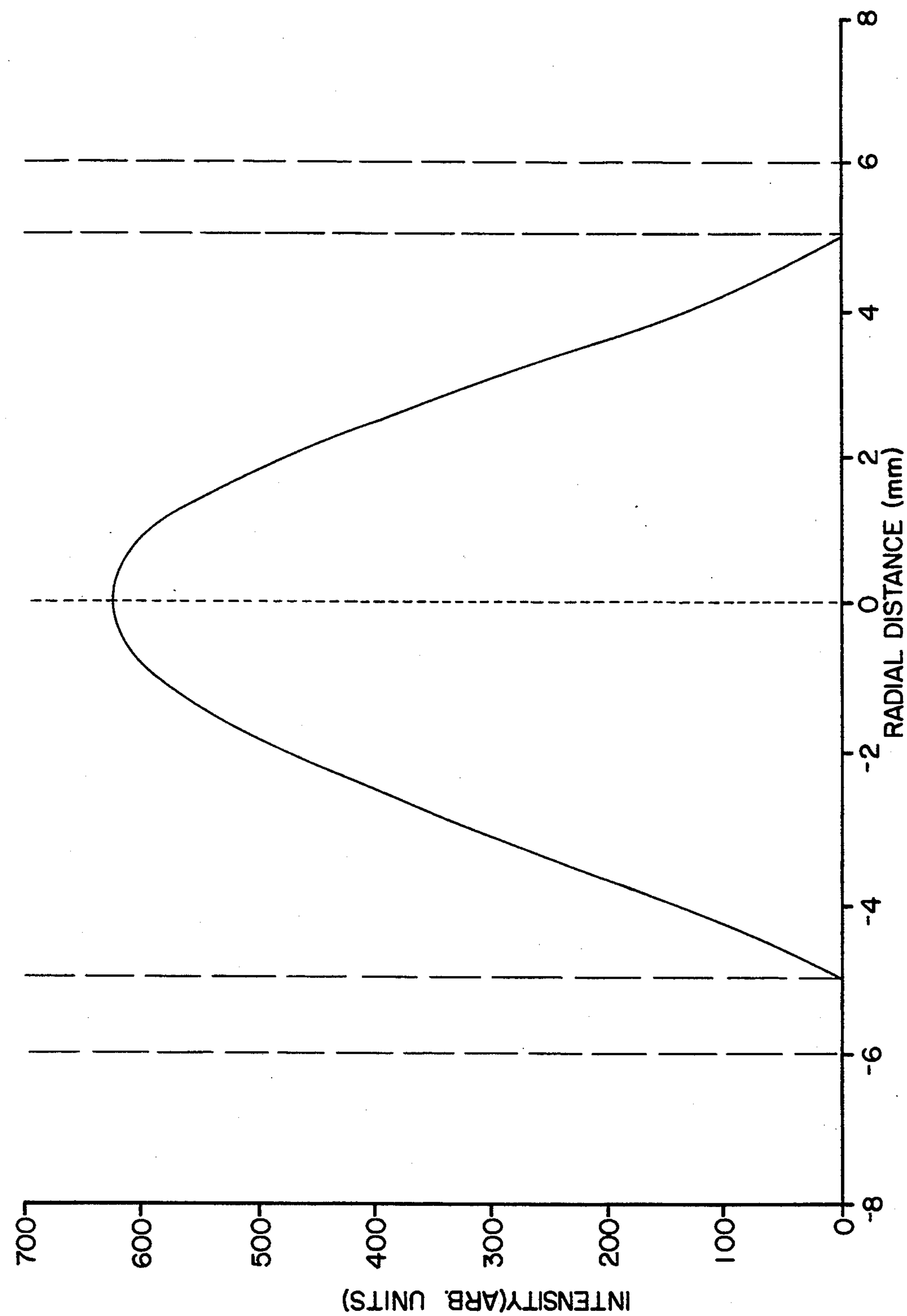

FIG. 10 shows an expected light intensity versus radial bulb position distribution for a D.C. excited laser of the prior art.

As mentioned above, practical metal vapor/inert gas devices of the prior art are typically excited by the application of D.C. to electrodes within the laser tube, or by the use of a hollow cathode. As previously explained, these lasers are subject to many disadvantages, including radially non-uniform light output, low power output, gas contamination caused by reaction of metallic electrodes with the metal vapor, and short lifetime.

The present inventors have recognized that advantageous operation of gas lasers of the type using electrical excitation can be realized by eliminating the electrodes and/or cathode, and suitably exciting the laser fill with microwave energy. The term "electrical excitation" used herein distinguishes the class of lasers to which the invention pertains from lasers which are excited by other means, e.g., chemical lasers or radiation excited lasers.

Figure 1:
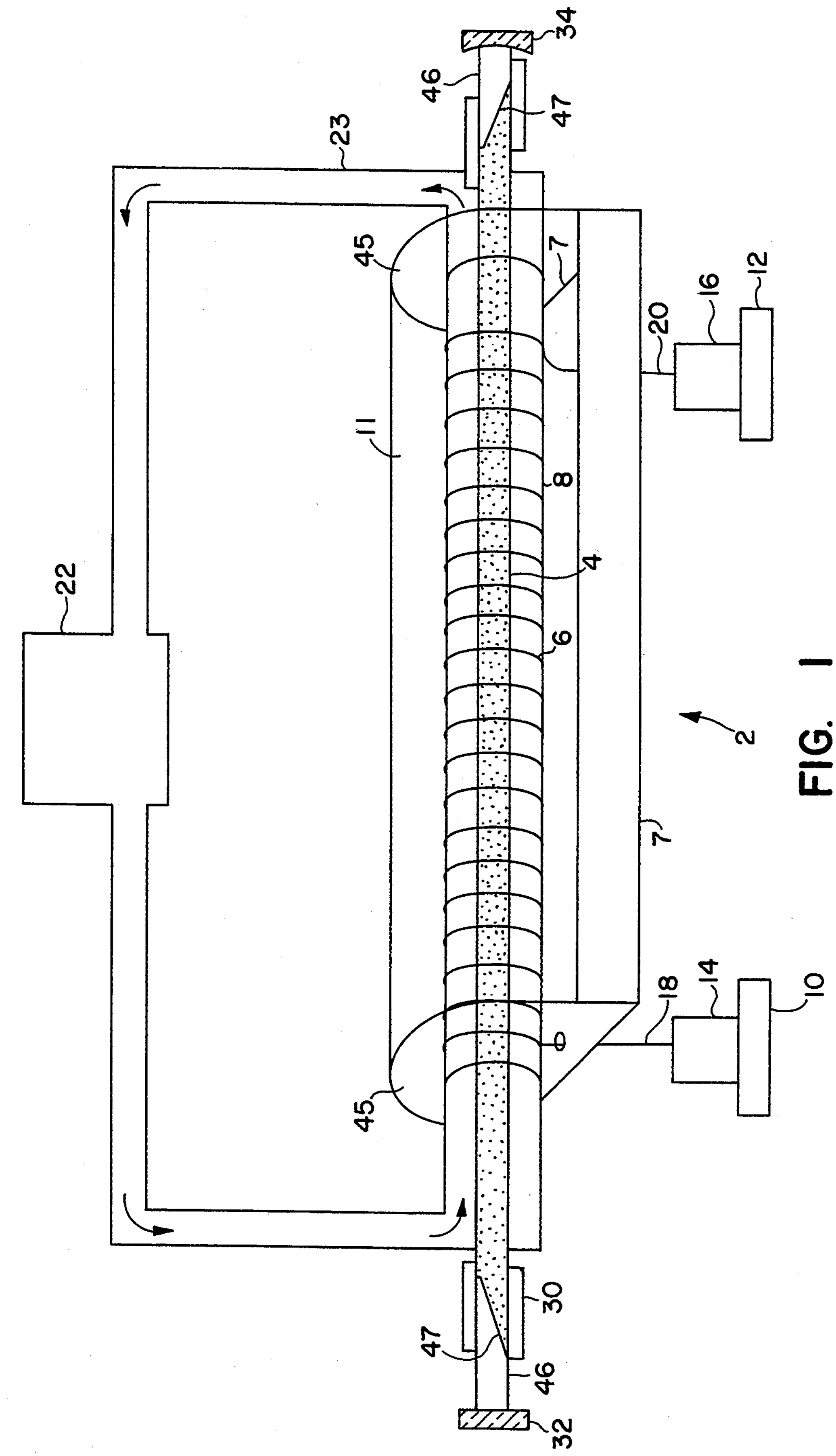
FIG. 1 is a pictorial illustration of the preferred embodiment of the invention.

FIG. 1 shows the preferred embodiment of the invention. Referring to the Figure, laser 2 is seen to include tube or housing 4, which is made of quartz or other suitable material, and is filled with the an inert gas and a gaseous species capable of accepting energy via charge transfer or resonant transfer, such as a vapor electronegative species or molecular or ion transition species during operation. Typical gas mixtures in the metal vapor/inert gas implementation are a few torrs of either He or Ne gas plus $10^{-3}$ to $10^{-2}$ torr metal vapor. The vapor gases of metal atoms including Cd, Zn, Hg, Ag, Au, Cu, Mg, Pb, or Ga may be used. Furthermore, electronegative species including S, Se, and Te, and the halides of Ag, Au, or Cu may be used, and in the case of electronegative species, the inert gas would be present at a pressure of about 1 to 10 torr, while the electronegative species vapor would be present at a pressure of about $10^{-4}$ to $10^{-2}$ torr. In both cases, the energy is first transferred to the inert gas, which then transfers the energy to the metal vapor or electronegative species, causing lasing of such substance.

Figure 2:
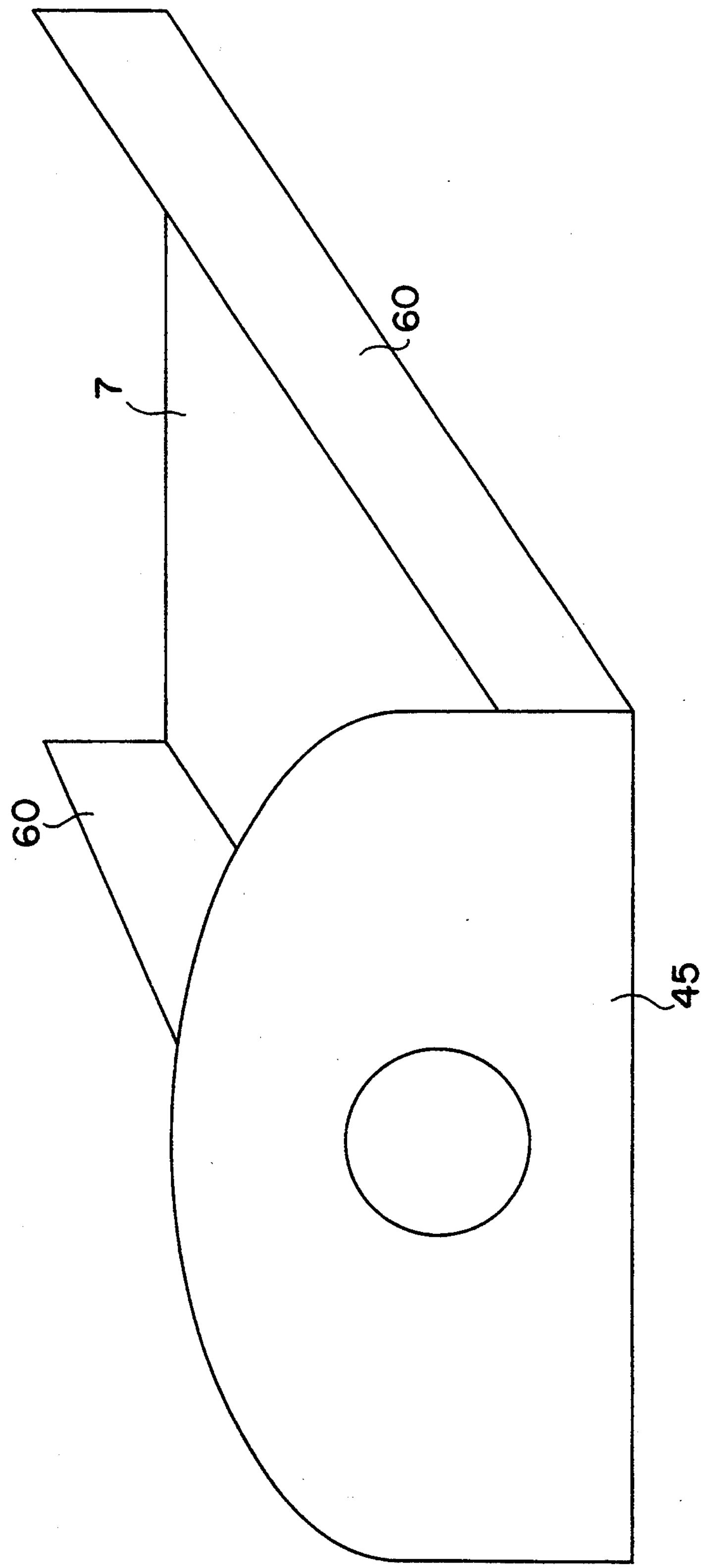
FIG. 2 is an end view of the structure to which the screened enclosure depicted in FIG. 1 is mounted.

The medium in tube 4 is excited by microwave energy, which is coupled to the medium by coupling means which includes a slow wave structure or configuration. In the preferred embodiment of the invention, the coupling means is a helical coil which is surrounded by an enclosure of conductive material. Thus, referring to FIG. 1, helical coil 6 is depicted, which is wound around mandrel 8, which may be made of quartz or other suitable material. The conducting enclosure may be wholly or partially a screen, and in FIG. 1 screened enclosure 11 is depicted surrounding tube 4 and helical coil 6 on the top, while conducting plate or channel 7 which is attached to enclosure 11 on the sides, surrounds tube 4 on the bottom. Enclosure 11 is made of metallic or other conductive material, and the screening is dense enough so that the enclosure is substantially opaque to microwave energy. In FIG. 1, metallic or conductive end plate 45 is depicted at the left end, while there is a similar plate at the right end. Screen 11 is wrapped around these plates at the ends of the screen. In the preferred embodiment, the conductive enclosure has a "D-shaped" cross-section, as is depicted in FIG. 2, wherein screened member 11 of FIG. 1 would be wrapped around end plate 45 and attached to the sides 60 of solid conducting channel 7. The attachment may be by screws, soldering, or other means.

One or more microwave sources, such as sources 10 and 12. generate microwave energy, which is fed to waveguides 14 and 16 respectively. The respective ends 18 to 20 of the helical coil are disposed in holes in the respective waveguides, so that the microwave energy is coupled to the helical coil. Other methods of coupling the microwave energy to the helical coil such as coupled helices or coaxial cable transitions, as well as dual helical coil coupling are known, and may be used instead of the arrangement which is shown in FIG. 1. The lasers of the invention may be operated in the continuously operated (cw) or pulsed mode. The terms "microwave" and "microwave region" throughout the specification and claims is intended to include the microwave region of about 900 MHz to about 15 GHz.

In the operation of the laser, it is important to keep the laser tube or housing wall at nearly a constant or fixed temperature along such wall to create uniform density of metal vapor throughout the discharge tube. If this is not done, the metal vapor will become more concentrated in certain portions along the length of the tube than in other portions, with the result that the power output of the device will be reduced. One way of obtaining such substantially constant temperature is by circulating a microwave transparent fluid in a heat exchanger which surrounds the laser tube. Thus, referring to FIG. 1, the temperature of the fluid is controlled in external reservoir 22, for example by heating the reservoir, and the fluid is pumped in recirculating fashion through heat exchanger tube 23. A high temperature variant of dimethyl polysiloxane or other microwave transparent fluid which will operate at high temperature may be used.

A heat pipe may be used as an alternative to the circulating fluid.

A "cold point arm", i.e., a reservoir held at a temperature less than the rest of the system, may be used to control the density of metal vapor, but will not result in a substantially constant vapor density along the length of the tube.

On each end of the gain tube is placed an evacuated arm 46 which abuts a Brewster window 47 which may be secured, as by laser welding to the assembly. The Brewster window may minimize any reflective losses to the laser radiation, while the evacuated "arms" eliminate gas turbulence. Minimizing turbulence is important to achieving stable laser operation and good beam quality. Mirrors 32 and 34 establish optical feedback, causing the laser to oscillate, and form either a stable or unstable laser resonator.

Two other details shown in the embodiment of FIG. 1 should be noted. At high temperatures, quartz glass has a high gas permeation for helium; i.e., the helium diffuses rapidly through the outer walls/windows of the laser gain plasma cell. Such decreases in the helium pressure inside the laser gain cell will reduce the performance of the laser system. One way to minimize this is to continuously pump helium through the gain tube so as to maintain its pressure. In accordance with another approach, the gain tube 4 may be made of low helium gas permeation material. The inner surface of window 47 of the laser gain cell is kept warmer than the wall of the gain cell by either the infrared radiation from the laser gain medium and/or an external resistive heater 30 to prevent metal condensation on the window surface.

An alternative approach to maintaining constant helium pressure is to "leak" helium through a thin quartz membrane from a high pressure reservoir into the gain tube. The rate of helium diffusion into the tube may be preset by a choice of the quartz membrane's area and thickness and the reservoir pressure (i.e., a calibrated leak) or may be dynamically changed by controlling the temperature of the quartz membrane.

Figure 3:
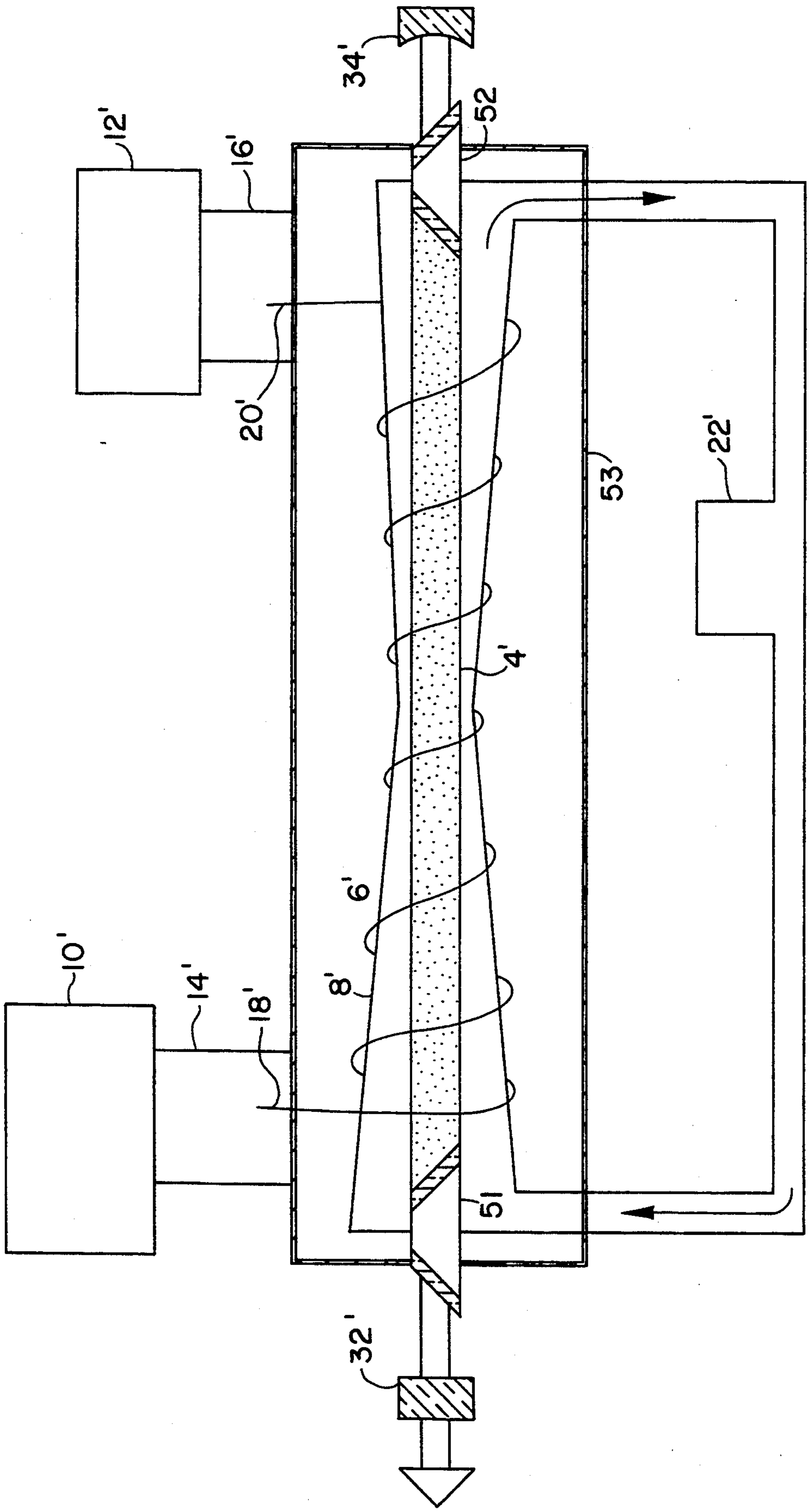
FIG. 3 is a pictorial illustration of a further embodiment of the invention.

FIG. 3 shows a further embodiment of the invention, wherein a tapered mandrel 8' is utilized. This mandrel, which is tapered towards the center, is believed to promote axial uniformity of the emitted light. In FIG. 3, parts similar to those in FIG. 4 are identified with the same reference numerals. In the embodiment of FIG. 3, double Brewster window/evacuated housings 51 and 52 are utilized, as is a microwave shield 53 of conductive material which surrounds the plasma tube.

The improved operation of the laser shown in FIG. 1 will now be described in greater detail. In this regard, reference is made to FIGS. 4 and 5, which provide a theoretical basis for understanding such operation.

FIG. 4 is an approximate depiction of the E field components which are produced by a helical slow wave structure. These include the field in the longitudinal direction, $E_Z$, the field in the radial direction, $E_R$, and the field in the azimuthal direction, $E_\phi$.

FIG. 5*a* shows the approximate variation of the gas density number N within the gain tube walls, which are depicted by the vertically extending dotted lines. It will be noted that the number density has an inverse parabolic variation which is due to the diffusion of atoms to the tube's cooler walls. FIG. 5*b* shows the approximate total E field from FIG. 4. Finally, FIG. 5*c* shows E/N, that is the curve of FIG. 4*b* divided by the curve of FIG. 5*a*, which is much more uniform and independent of radius than either E or N individually. It should be noted that in the term E/N as used herein, the term "E" refers to the field which is applied to the laser tube rather than the field which may be experienced by the plasma.

It has been observed that the laser which is shown in FIG. 1 has a radially uniform E/N. This means that a uniform discharge pumping rate is established throughout the lasing volume and that the laser has a radially uniform gain and light output. Therefore, the medium within tube 4 comprises a radially uniform gain medium. It should be noted that the gain characteristic of the laser of the present invention is improved when compared with, for example, the D.C. excited metal vapor lasers of the prior art, wherein the radial $E_Z$/N variation is parabolic in shape.

The radially uniform light output of the laser of the invention is a significant advantage. Because the light output does not fall substantially at the tube walls, more total power may be extracted from the device. Additionally, the radially uniform light output allows the use of optical systems which could not be used if uniformity was not present, which is important in how the laser may be utilized.

While the embodiment of FIG. 1 shows a helical coil, it may be possible to use other types of slow wave structures or closed structures, such as those which are depicted in FIGS. 6 to 8, which utilize disc-like members, and other structures which provide a symmetric field distribution.

Referring to FIG. 6, a plurality of circular disc-like members 70 are disposed in microwave enclosure or cavity 72. Laser gain cell 74 is disposed through holes in the disc-like members.

FIG. 7 shows a hole coupled device, wherein circular disc-like members 80 have coupling holes 82 disposed therein. Additionally, resonator tubes 84 extend from the discs, and gain cell 86 extends through such tubes. This assembly is disposed in microwave enclosure or cavity 87.

FIG. 8 shows a slow wave structure which utilizes helically shaped disc-like members 90 in waveguide 91 through which gain tube 92 extends.

It should be noted that while the embodiments disclosed herein relate to gain tubes having circular cross-sections and slow wave structures of corresponding shape, the coupling modes disclosed may also be used with gain-tubes having non-circular cross-sections, although the concept of radial uniformity may not generally be applicable to such configurations.

A laser as shown in FIG. 1 was built and tested. The gain tube was 125 cm long and had an interior diameter of 10 mm. It was filled with 1.2 torr helium and 10 milligrams of the metal $Cd^{114}$. The laser was powered with 300 watts of microwave energy, and at an approximate operating temperature of 215° C., the fill was comprised of about 1.2 torr of helium and 0.835 millitorr of $Cd^{114}$.

FIG. 9 shows the intensity of the 4416 Å Cd line typical of a laser transition in the He/Cd laser system as a function of radial distance across the 10 mm ID laser tube. It will be observed that the spectral emission is relatively uniform in the radial direction.

FIG. 10 shows the expected intensity distribution for a D.C. excited metal vapor based laser. It is seen that the distribution is parabolic, and falls off towards the tube walls much faster than the distribution of FIG. 9, which is achieved with the present invention.

There thus have been disclosed gas lasers which are capable of improved operation. While the invention has been illustrated in connection with metal vapor based lasers, as noted above, it is broadly applicable to a class of gas lasers including inert gas ion lasers, CO and $CO_2$ lasers. Furthermore, it should be understood that variations of this invention which fall within its spirit and scope may occur to those skilled in the art, and the invention is to be limited only by the claims appended hereto and equivalents.

We claim:

1. A metal vapor/inert gas laser, comprising, a laser tube which contains an excitable medium containing an inert gas and metallic material which is capable of vaporizing and lasing, the metallic material when vaporized being present in a much smaller amount than the inert gas, source means generating microwave energy, and coupling means which includes a slow wave structure in proximate relation to said laser tube for coupling microwave energy from said source means to the excitable medium in said laser tube.

2. The laser of claim 1 wherein said coupling means includes a conductive enclosure.

3. The laser of claim 2 wherein the conductive enclosure completely surrounds the laser tube.

4. The laser of claim 2 wherein the conductive enclosure is in at least substantial part a screened enclosure.

5. The laser of claim 4 wherein the slow wave structure structure comprises a helical coil which surrounds the tube which contains the excitable medium.

6. The laser of claim 5 further including means for causing the wall of the laser tube to have a substantially uniform temperature.

7. The laser of claim 2 further including means for causing the wall of the laser tube to have a substantially uniform temperature.

8. The laser of claim 7 wherein said means for causing the wall of the laser tube to have a substantially uniform temperature comprises means for circulating fluid around the tube and means for controlling the temperature of the fluid.

9. An electronegative species/inert gas laser, comprising, a laser tube which contains an excitable medium containing an inert gas and non-metallic electronegative species material which is capable of vaporizing and lasing, the non-metallic material when vaporized being present in a much smaller amount than the inert gas, source means generating microwave energy, and coupling means which includes a slow wave structure in proximity to said laser tube for coupling microwave energy from said source means to the excitable medium in said laser tube.

10. The laser of claim 9 wherein said coupling means also includes a conductive enclosure.

11. The laser of claim 10 further including means for causing the wall of the laser tube to have a substantially uniform temperature.

12. The laser of claim 11 wherein said means for causing the wall of the laser tube to have a substantially uniform temperature comprises means for circulating fluid around the tube and means for controlling the temperature of the fluid.

13. The laser of claim 10 wherein said conductive enclosure completely surrounds the laser tube.

14. The laser of claim 10 wherein the conductive enclosure is at least in substantial part screened.

15. The laser of claim 14 wherein the slow wave structure comprises a helical coil which surrounds the tube which contains the excitable medium.

* * * * *